United States Patent [19]
Fukuda et al.

[11] Patent Number: 5,914,927
[45] Date of Patent: Jun. 22, 1999

[54] OPTICAL DISK APPARATUS

[75] Inventors: Misao Fukuda; Hiroyuki Hishiyama, both of Tokyo; Keishi Ueno, Hanno; Akira Mashimo, Tokorozawa, all of Japan

[73] Assignees: NEC Corporation; Teac Corporation, both of Tokyo, Japan

[21] Appl. No.: 09/021,112

[22] Filed: Feb. 10, 1998

[30] Foreign Application Priority Data

Feb. 12, 1997 [JP] Japan ..................................... 9-028094

[51] Int. Cl.⁶ ....................................................... G11B 7/00
[52] U.S. Cl. ............................................... 369/54; 369/47
[58] Field of Search ................................. 369/54, 58, 42, 369/48, 49, 50, 59, 116, 112

[56] References Cited

U.S. PATENT DOCUMENTS

| | | | |
|---|---|---|---|
| 5,070,495 | 12/1991 | Bletscher, Jr. et al. | 369/54 X |
| 5,249,172 | 9/1993 | Hagihara et al. | 369/54 X |
| 5,450,383 | 9/1995 | Call et al. | 369/54 X |
| 5,493,549 | 2/1996 | Miyazawa | 369/54 |
| 5,513,166 | 4/1996 | Tokumitsu et al. | 369/116 |
| 5,602,814 | 2/1997 | Jaquette et al. | 369/58 |

FOREIGN PATENT DOCUMENTS

| | | |
|---|---|---|
| 349049 | 3/1991 | Japan . |
| 3276430 | 12/1991 | Japan . |
| 5166188 | 7/1993 | Japan . |
| 689438 | 3/1994 | Japan . |

*Primary Examiner*—Muhammad N. Edun
*Attorney, Agent, or Firm*—Ladas & Parry

[57] ABSTRACT

An optical disk apparatus having an optical head for reading and writing signals on an optical disk and a signal processing unit for performing predetermined signal processing on the signals is disclosed. The apparatus includes a first controller, a second controller, a detector, and an adjuster. The first controller controls the optical head to write a predetermined signal on a predetermined area of the optical disk with various levels of recording power of the optical head. The second controller reproduces the predetermined signal written on the predetermined area of the optical disk. The detector attempts to detect a predetermined signal pattern having a predetermined period from the reproduced signal with different slice levels. The adjuster determines a resolution of the reproduced signal in accordance with a slice level with which the signal pattern can be detected and automatically adjusts the recording power of the optical head based on the determined resolution.

7 Claims, 9 Drawing Sheets

OPTICAL DISK APPARATUS

BACKGROUND OF THE INVENTION

1. Field of the Invention

The present invention generally relates to optical disk apparatuses, and more particularly to an optical disk apparatus which detects a resolution of reproduced waves of signals recorded on an optical disk to automatically adjust the recording power.

2. Description of the Related Art

Memory media in the form of disks which are replayed by means of laser pickups of optical disk apparatuses are generally used as memory media which store information such as data bases and computer programs. The optical apparatuses include "read only type" apparatuses which can only read out information recorded on disks such as CDs (compact discs) and CD-ROMs, and "read and write type" apparatuses which can also write information on disks. The "read and write type" apparatuses include "write-once type" apparatuses (CD-R) which can write information only once and "erasable type" apparatuses which can write information any number of times such as magneto-optic disk (MO) apparatuses and phase change type disk (PD, CD-RW) apparatuses.

Since the conventional optical disk apparatuses are dedicated to any one of the above types of disks, it is necessary to have a plurality of optical disk apparatuses to replay the various types of disks. In order to avoid such an inconvenience, optical disk apparatuses have been developed which can replay different types of disks. One of such conventional optical disk apparatuses is an apparatus which has a disk cartridge mounted thereon containing CD-ROMs and PD disks.

Such optical disk apparatuses which can be used for both CD-ROMS and PD disks generally consist of an optical head, an optical system control part, a CD system signal processing part, a PD system signal processing part, and a motor driver. The optical head reads out information recorded on a disk or writes information on the disk. The optical system control part performs focus and tracking control of the optical head, drives a laser diode and control the output power thereof.

To replay a CD or a CD-ROM, signals which have been read out by the optical head are delivered to the CD system signal processing part via a signal system AGC amplifier. The CD system signal processing part performs signal processing such as EFM demodulation and error correction, with a spindle motor being CLV (Constant Linear Velocity) controlled by the motor driver to be actuated at a constant linear velocity.

To replay a PD disk, signals which have been read out by the optical head are delivered to the PD system signal processing part via the signal system AGC amplifier. The PD system signal processing part performs signal processing such as (2–7) demodulation and error correction. To record data on a PD disk, data signals to be written are subjected to signal processing such as (2–7) modulation. The data signals are then provided as recording signals to the optical system control part. When a PD is replayed or recorded, the spindle motor is ZCAV (Zone Constant Angular Velocity) controlled by the motor driver and a PD system CAV control circuit to rotate at a constant angular velocity.

In the optical disk apparatuses having the above construction, even if data is written to optical disks with the same recording power, resolutions of signals reproduced from each disk may change due to variations in the mechanical and electrical properties of the optical heads. For this reason, operations are conventionally carried out for determining an optimal value of a recording power of laser light which is emitted by the optical head and adjusting the recording power to the optimal value in an inspecting process after assembly of the apparatus.

The conventional operations for adjusting the recording power have been carried out in the following steps:

step 1: changing the recording power of laser light emitted from the optical head in a step-wise manner, and sequentially recording a signal with the different recording power;

step 2: after the recording with the different recording power, reproducing the recorded signal and monitoring the reproduced signal by an oscilloscope;

step 3: detecting a level of the recording power with which a predetermined resolution can be obtained, and storing the level as an optimal value of the recording power in a memory (EEPROM) of each drive;

step 4: performing the above steps 1 through 3 on the most internal part and the most external part of a disk, and deriving linearly approximated values for the intermediate part from optimal values for the most internal and the most external parts.

However, since the above steps 1 through 4 have been conventionally carried out manually by operators, it takes a relatively long time to adjust the recording power to an optimal value, and in addition, the optimal value may fluctuate due to personal differences among the operators.

Further, although conventional optical disk apparatuses are shipped after the recording power has been adjusted to an optimal value by means of the above steps, the intensity of laser beams may decrease and thus the recording power may change due to secular changes (e.g., blur of lenses, adhesion of dusts to lenses, and deterioration in performance of the laser diode) after shipment of the apparatus. As a result, a possibility of error occurrence in reading or writing increases with the passage of time.

SUMMARY OF THE INVENTION

Therefore the object of the present invention is to provide an optical disk apparatus which can resolve the above problems.

The above object of the present invention is achieved by an optical disk apparatus having an optical head for reading and writing information on an optical disk and a signal processing unit for performing predetermined signal processing on information read out from or to be written to the optical disk, comprising: a first controller for controlling the optical head to write a predetermined signal on a predetermined area of the optical disk with various levels of recording power of the optical head; a second controller for reproducing the predetermined signal written on the predetermined area of the optical disk; a detector for attempting to detect a predetermined signal pattern having a predetermined period from the reproduced signal with different slice levels; an adjuster for determining a resolution of the reproduced signal in accordance with a slice level with which the signal pattern can be detected and automatically adjusting the recording power of the optical head based on the determined resolution.

Accordingly, since the recording power of the optical head is automatically adjusted, it is unnecessary to manually adjust the recording power in an inspection process after assembly of the apparatus, and thus the inspection process can be completed in a short time. In addition, fluctuations in the adjustment due to personal differences among operators can be eliminated, and it is thus possible to precisely adjust the recording power to an optimal value.

The detector may comprises a window generator for generating a slice window which is opened in accordance with the level of the reproduced signal relative to each of the slice levels; a read pulse generator for generating a single read pulse every time the window is opened; a determination part for counting the number of the read pulses and determining whether the predetermined signal pattern can be detected based on the counted number.

The determination part may count the read pulses based on error correction codes which are generated by the signal processing unit in accordance with the read pulses.

The predetermined area of the optical disk may be a test recording area. Accordingly, it is not necessary to use recording areas of the optical disk and thus the capacity of the optical disk is not reduced.

The adjuster may automatically adjust the recording power of the optical head when the number of error occurrences in writing information is greater than a predetermined value. Accordingly, it is possible to adjust the recording power to an optimal value if the recording power of the optical head has decreased due to secular changes in the apparatus after the shipment thereof.

The adjuster may automatically adjust the recording power of the optical head at a predetermined time interval. Accordingly, it is possible to maintain the recording power at an optimal value.

The adjuster may automatically adjust the recording power of the optical head when power supply to the apparatus is set to ON. Accordingly, it is possible to always adjust the recording power to an optimal value prior to the recording or reproduction of information.

Other objects and further features of the present invention will be apparent from the following detailed description when read in conjunction with the accompanying drawings.

DESCRIPTION OF THE PREFERRED EMBODIMENTS

In the following, a principle and an embodiment of the present invention will be described with reference to the accompanying drawings.

Figure 1:
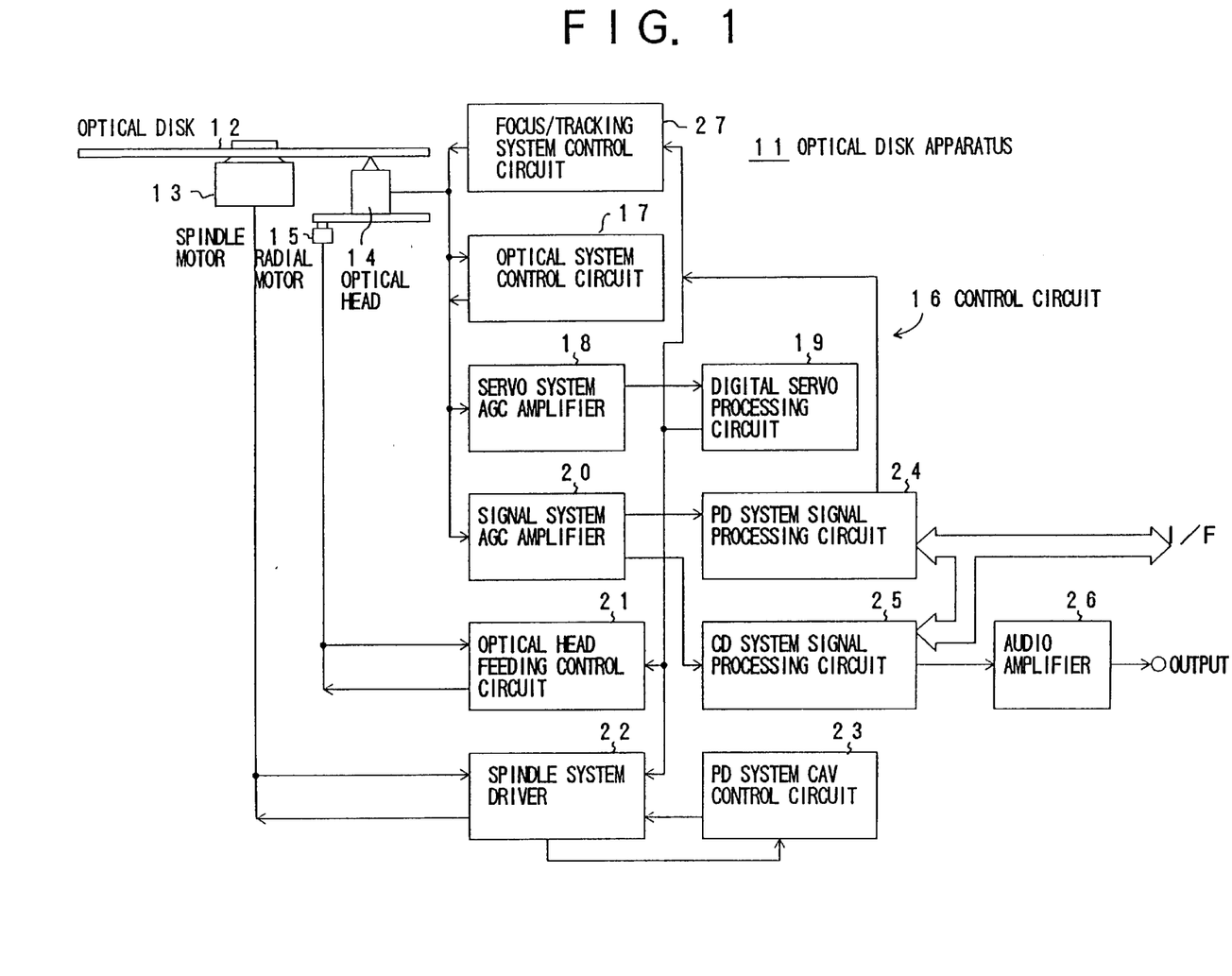
FIG. 1 is a block diagram showing an optical disk apparatus according to the present invention.

FIG. 1 is a block diagram of an optical disk apparatus according to the present invention. The optical disk apparatus 11 generally comprises a spindle motor 13 for rotating an optical disk 12, an optical head 14 for projecting laser light on a recording surface of the optical disk 12 to write information to the optical disk 12 or read out information on the optical disk 12, a radial motor 15 for actuating the optical head 14 in the radial direction of the disk, and a control circuit 16 for controlling the optical head 14 and the motors 13, 15.

The control circuit 16 consists of LSI circuits, including an optical system control circuit 17 for controlling the intensity of laser light emitted by a laser diode which is provided on the optical head 14, a servo system AGC amplifier 18, a digital servo processing circuit 19, a signal system AGC amplifier 20, an optical head feeding control circuit 21 for controlling the radial motor 15, a spindle system driver 22 for controlling the spindle motor 13, a PD system CAV control circuit 23, a PD system signal processing circuit 24 for controlling recording and reproduction of PDs, a CD system signal processing circuit 25 for controlling recording and reproduction of CDs, an audio amplifier 26 for amplifying audio signals which have been reproduced from a CD, and a focus/tracking system control circuit 27.

When a CD or a CD-ROM is replayed, signals read out by the optical head 14 are amplified by the signal system AGC amplifier 20 and delivered to the CD system signal processing circuit 25. The CD system signal processing circuit 25 then performs signal processing such as EFM demodulation and error correction on the signals, and outputs the resultant signals via the audio amplifier 26 in the case of CDs or, in the case of CD-ROMs, directly to an interface circuit of a personal computer. While the CD system signal processing circuit 25 is performing the above signal processing, the spindle motor 13 is CLV (Constant Linear Velocity) controlled by the spindle system driver 22 to be actuated at a constant linear velocity.

When a PD is played, signals read out by the optical head 14 are amplified by the signal system AGC amplifier 20 and delivered to the PD system signal processing circuit 24. The PD system signal processing circuit 24 performs signal processing such as (2-7) demodulation on the signals, and outputs the resultant signals to the interface circuit. When a PD is recorded, the PD system signal processing circuit 24 performs signal processing such as (2-7) modulation on signals and delivers the resultant signals to the optical system control circuit 17. When the PD system signal processing circuit 24 is performing the above signal processing, the spindle motor 13 is ZCAV (Zone Constant Angular Velocity) controlled by the spindle system driver 22 and the PD system CAV control circuit 23 to rotate at a constant angular velocity.

Now, descriptions will be given of an operation for automatically adjusting the recording power of the optical head 14 carried out by the optical system control circuit 17. As will be described below in detail, the optical system control circuit 17 reproduces predetermined signals recorded on the optical disk 12 while sequentially changing a slice level to detect the envelope of the reproduced signals, detects the resolution of the reproduced signals based on the slice level with which a signal pattern having a predetermined period can be obtained, and automatically adjusts the recording power of the optical head 14 based on the determined resolution. Thus, it is unnecessary to manually adjust the recording power in an inspection process after assembly of the apparatuses, and thus the inspection process can be completed in a relatively short time. In addition, fluctuations in the adjustment due to personal differences among operators can be eliminated, and it is thus possible to precisely adjust the recording power to an optimal value.

Figure 2:
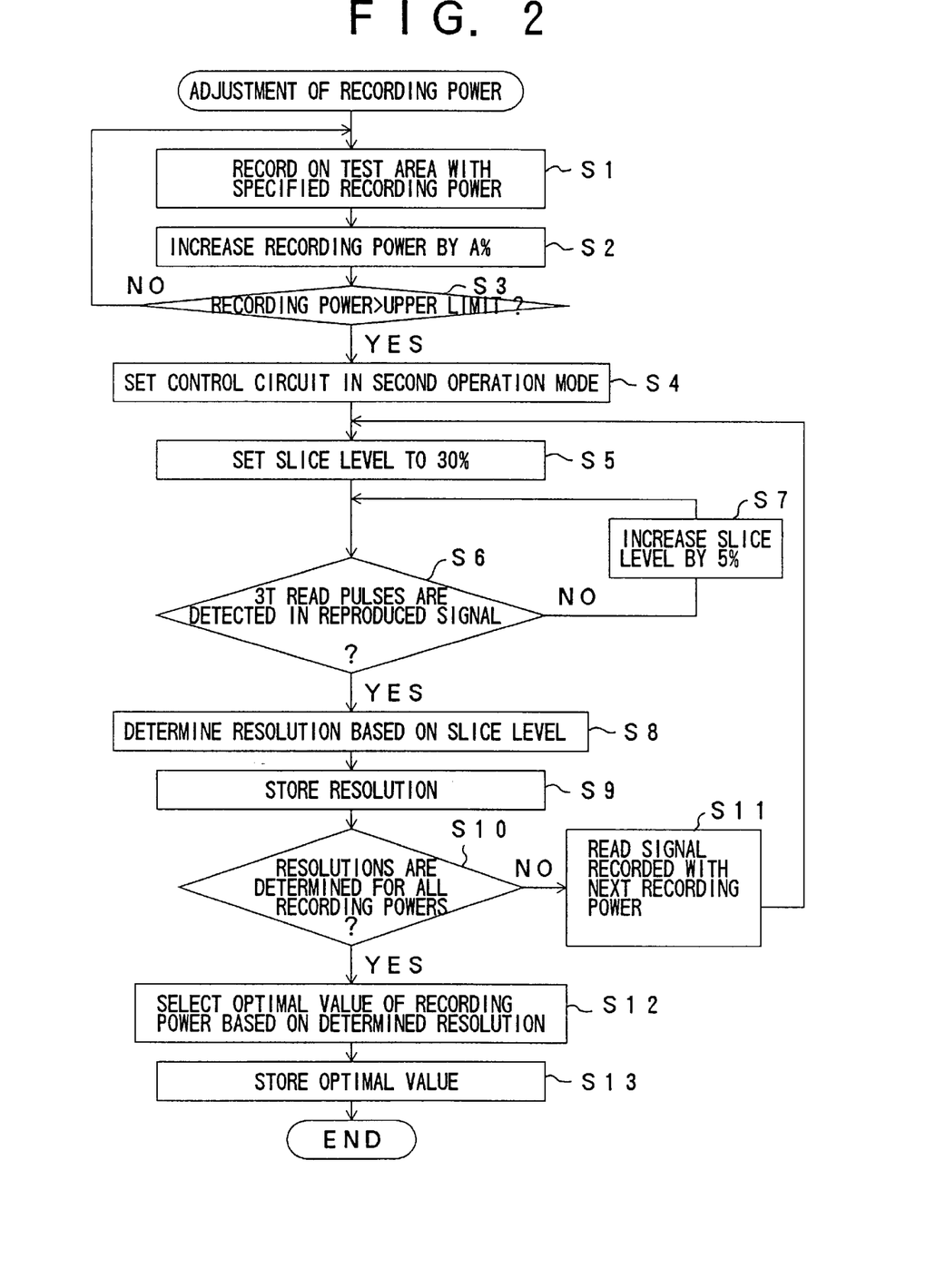
FIG. 2 is a flowchart of an operation for automatically adjusting a recording power of an optical head.
Figure 3:
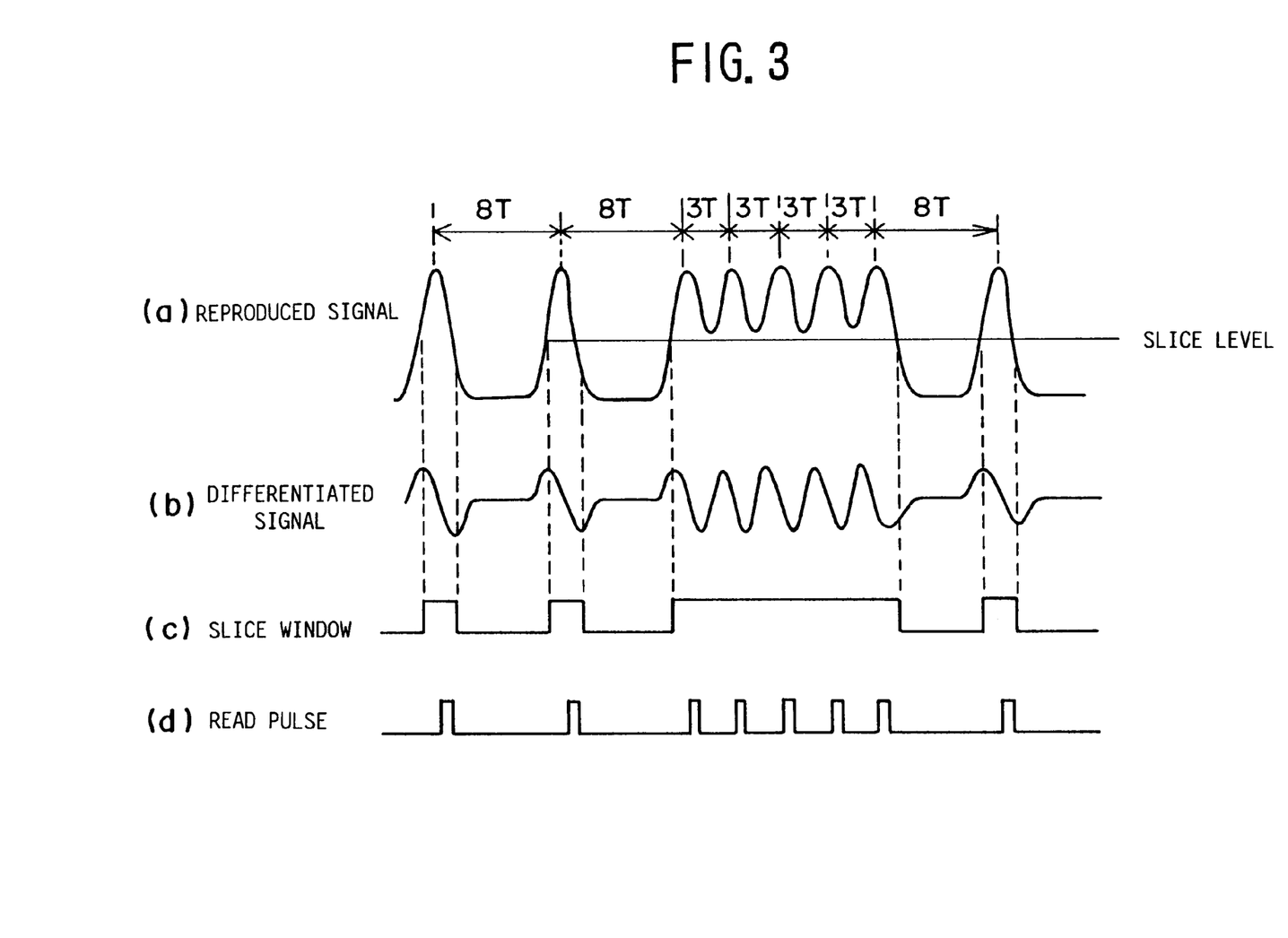
FIG. 3 shows signals obtained in a first operation mode of an LSI circuit used in an embodiment of the present invention.

FIG. 2 is a flowchart of the operation for automatically adjusting the recording power of the optical head 14. The optical system control circuit 17 performs the operation of FIG. 2 in an inspection process after assembly of the apparatus. When the operation is started, first, in step S1, a predetermined signal is recorded on a test area of the optical disk 12 with a predetermined recording power. As seen from the reproduced signal shown in FIG. 3(a), the predetermined signal comprises an 8T-pattern and a 3T pattern. The 8T-pattern fluctuates between zero and a predetermined maximum level with a period of 8T. The 3T-pattern follows the 8-T pattern and fluctuates between a certain level greater than zero and the predetermined maximum level with a period of 3T. Here, T is a reference period of time of the predetermined signal.

In step S2, the recording power of the optical head 14 is increased by a predetermined step (A%). Then, in step S3, it is determined whether or not the increased recording power of the optical head 14 exceeds an upper limit. If the increased recording power of the optical head 14 is equal to or less than the upper limit, the above steps S1 through S3 are repeated. Thus, the predetermined signal is recorded on the test area of the optical disk 12 with the recording power being increased in a step-wise manner.

If, in step S3, the recording power of the optical head 14 exceeds the upper limit, the control circuit 16 in the form of LSI circuits is switched from a first operation mode to a second operation mode. Now, descriptions will be given of the LSI circuits which constitute the control circuit 16 of the present embodiment.

The PD system signal processing circuit 24 of the control circuit 16 includes a pulse detector. In the present embodiment, the resolution of a reproduced signal is automatically determined using signals which are provided by the pulse detector. Herein, the "resolution" is defined by the following equation:

$$\text{resolution} = (A_{3T}/A_{8T}) * 100(\%) \quad (1)$$

where $A_{3T}$ and $A_{8T}$ are the amplitudes of the 3T-pattern and the 8-T pattern, respectively, in the reproduced signal.

In the present embodiment, each of the signal processing circuits contained in the PD system signal processing circuit 24 is formed of LSI circuits and a microcomputer, and the pulse detector is formed of an LSI circuit.

Figure 4:
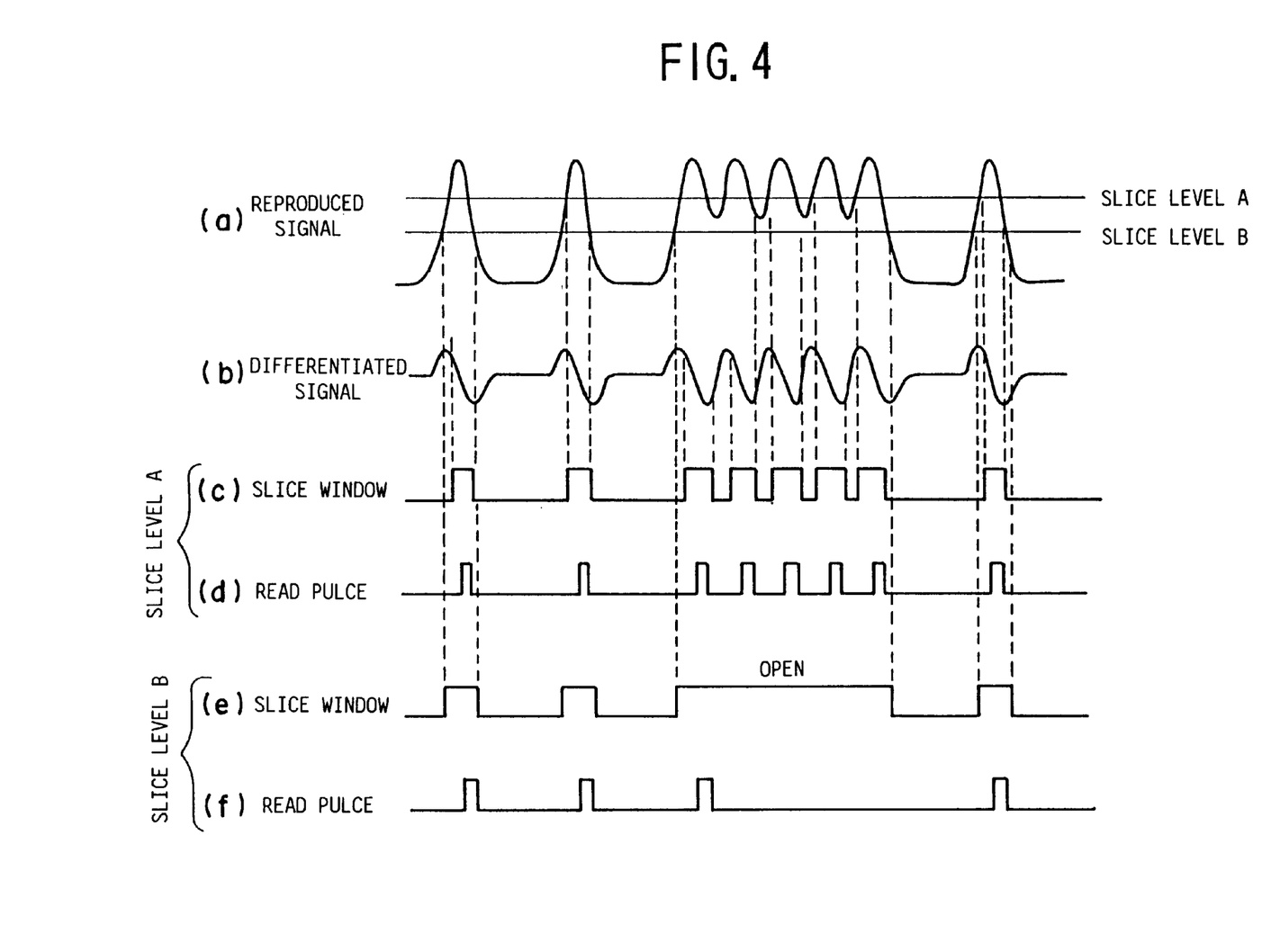
FIG. 4 shows signals obtained in a first operation mode of the LSI circuit used in an embodiment of the present invention

FIGS. 3 and 4 shows signals delivered by the PD system signal processing circuit 24. FIG. 3 shows the signal provided in the first operation mode of the control circuit 16, while FIG. 4 shows the signal provided in the second operation mode of the control circuit 16.

In the first operation mode of the control circuit 16, a slice window is generated which is opened while the reproduced signal read out from the test area of the optical disk 12 is greater than a specific slice level. Read pulses are then generated while the slice window is opened in accordance with a differentiated wave of the reproduced signal. Thus, in the first operation mode, read pulses corresponding to the differentiated signal are obtained, irrespective of the value of the slice level.

In the second operation mode of the control circuit 16, as in the case of the first operation mode, a slice window is generated which is opened while the reproduced signal is greater than a specific slice level. However, in this second operation mode, only one read pulse is generated every time the slice window is opened. Therefore, when a slice level A shown in FIG. 4 is used, read pulses corresponding to the 3T-pattern of the reproduced signal can be generated. Thus, it is possible to reproduce information with a sufficiently low error rate.

On the contrary, when a slice level B shown in FIG. 4 which is lower than the slice level A is used, the 3T-pattern of the reproduced signal cannot be detected because the slice level B is lower than the lowest level of the 3T-pattern of the reproduced signal. Thus, only one slice window is opened while the 3T pattern is being reproduced, and therefore only one pulse can be generated. As a result, it is not possible to reproduce information with sufficiently low error rate when the slice level B is used.

Figure 5:
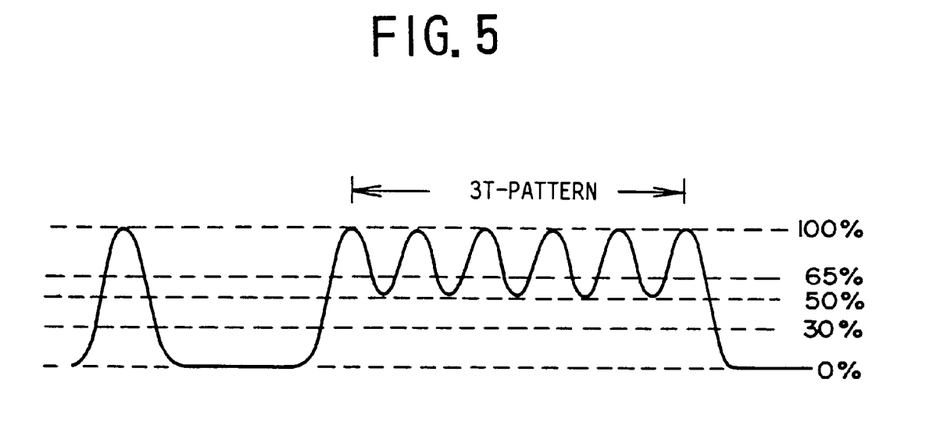
FIG. 5 shows a reproduced signal which was recorded with a certain recording power.

Assume that a signal which was recorded with a specific laser power has been reproduced as shown in FIG. 5. In this case, when the slice level is set to 30%, no pulses corresponding to the 3T-pattern can be generated and thus the error rate is large. If the slice level is gradually raised from 30%, read pulses corresponding to the 3T-pattern begin to be generated when the slice level exceeds about 50% and thus the error rate is decreased.

Figure 6:
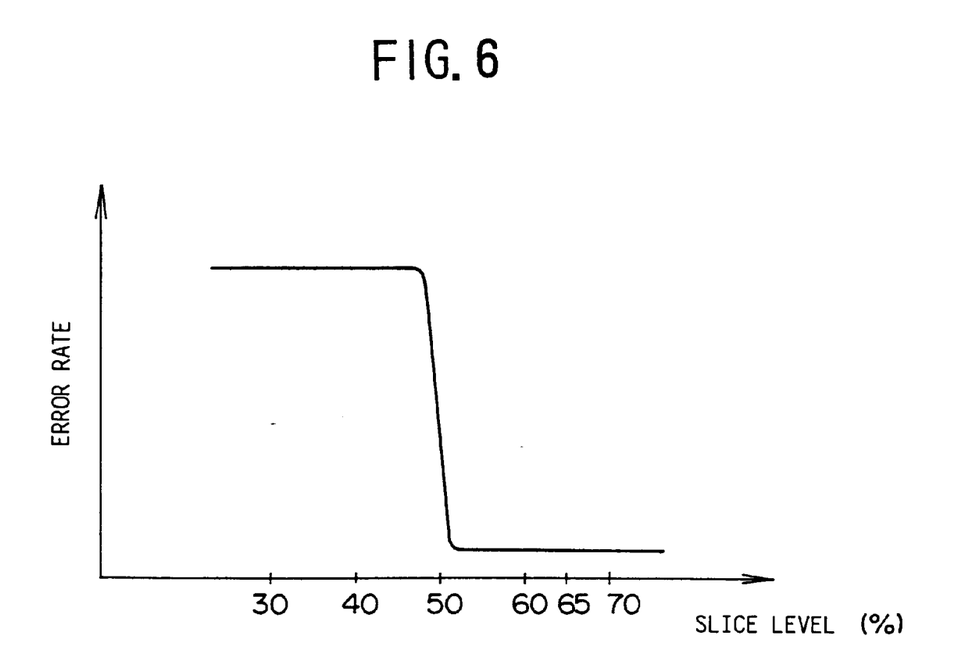
FIG. 6 is a graph showing a transition of error rates against a slice level.

FIG. 6 is a graph showing the transition of the error rate. Since pulses corresponding to the 3T-pattern begin to be normally generated when the slice level exceeds about 55% as seen from several slice levels shown in FIG. 5, the error rate is significantly decreased when the slice level changes from 50% to 55% correspondingly. In this case, a resolution of 45% is obtained in accordance with the above equation (1).

In this manner, a resolution with which pulses corresponding to the 3T-pattern can be completely generated is detected for each of various levels of the recording power, and the optimal value for the recording power is determined as a value of the recording power with which a desired resolution can be obtained. In the present embodiment, the desired resolution is, for example, 45%, and thus the recording power which provides a resolution of 45% is stored in a memory (EEPROM) as an optimal value thereof.

Referring again to the flowchart of FIG. 2, descriptions will be given of the operation for automatically adjusting the recording power.

When the second operation mode of the control circuit 16 is selected in the above step S4, the resolution can be determined based on the slice level in which the number of the 3T-pulses generated while the slice window is opened corresponds to the number of fluctuations of the 3T-pattern.

For this purpose, in the next step S5, the slice level is set to 30% as an initial slice level. Then, in step S6, it is determined whether or not read pulses corresponding to the 3-T pattern can be obtained from the reproduced signal with the slice level of 30%.

In the present embodiment, in step S6, by generating the slice window in accordance with the level of the reproduced signal relative to a specific slice level and generating a single read pulse every time the slice window is opened, the number of error correction codes generated by the PD system signal processing circuit 24 is counted. Then it is determined whether or not read pulses corresponding to the 3-T patterns can be obtained based on the counted number. The error correction codes are generated by the PD system signal processing circuit 24 corresponding to the read pulses. Therefore, it is possible to detect the number of read pulses by counting the number of the error correction codes.

If no read pulses corresponding to the 3T pattern are detected in step S6, it is determined that the present slice level is too low. In this case, the slice level is increased by a step of 5% in step S7. Then, again in step S6, it is determined whether or not read pulses corresponding to the 3T-pattern can be generated with the increased slice level (35%).

As described above, the slice level with which the 3T-pulses can be generated is determined by gradually increasing the slice level by a step of 5%. Thus, if it is determined that the read pulses corresponding to the 3T-pattern can be generated with a certain slice level in step S6, the resolution is determined based on the slice level in step S8 and the determined resolution is stored in a memory (EEPROM) in step S9.

In step S10, it is checked whether or not the resolutions have been determined for all of the signals recorded on the test area of the optical disk 12 with the various recording powers. If it is found that there still remains signals to be read out to determine the resolution, a signal recorded with the next level of the recording power is read out in step S11, and then the above steps S5 through S10 are repeated.

If, in step S10, it is found that the resolutions have been determined for all of the signals recorded on the test area of the optical disk 12, then in step S12, the recording power with which a desired resolution can be obtained is selected as an optimal value for the recording power. In step S13, the optimal value is stored in a memory (EEPROM) and the operation for automatically adjusting the recording power is finished.

Figure 7:
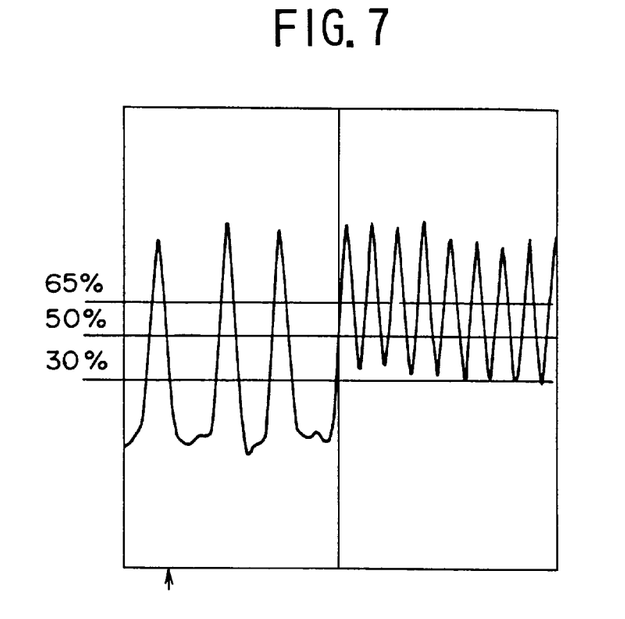
FIG. 7 shows a reproduced signal recorded with a relatively low recording power.
Figure 8:
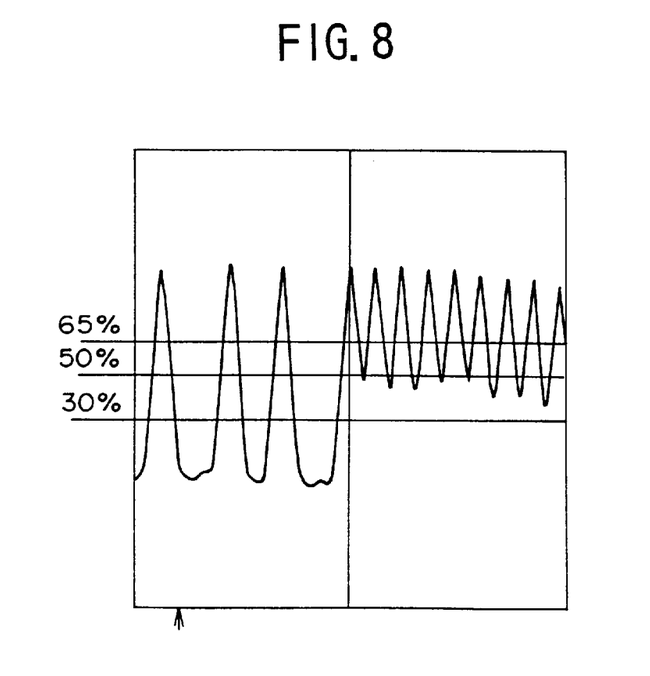
FIG. 8 shows a reproduced signal recorded with a relatively high recording power.

FIGS. 7 and 8 show reproduced signals when the recording power of the optical head 14 is increased in a step-wise manner. FIG. 7 shows the reproduced signal when the recording power is relatively low and FIG. 8 shows the reproduced signal when the recording power is relatively high.

In the case of FIG. 7, read pulses which approximately correspond to the 3T-pattern begin to be detected when the slice level has reached about 35% and read pulses which perfectly correspond to the 3T-pattern are detected when the slice level has reached about 45%. Consequently, by adjusting the recording power of the laser light so that a resolution of 55% is obtained, it is possible to perfectly read out data (information) recorded on the optical disk 12 without errors.

In the case of FIG. 8, read pulses which approximately correspond to the 3T-pattern begin to be detected when the slice level has reached about 50% and read pulses which perfectly correspond to the 3T-pattern are detected when the slice level has reached about 55%. Consequently, by adjusting the recording power of laser light so that a resolution of 45% is obtained, it is possible to perfectly read out data (information) recorded on the optical disk 12.

Here, the state in which data can be perfectly read out means a state in which no pulse is lost within the reproduced signal and data recorded on the optical disk 12 can be read out without any errors. In order to compensate for variations in the data read out from the disk, the above operation is performed on a plurality of sectors of the optical disk 12.

From the above result, the resolutions of the reproduced signals shown in FIGS. 7 and 8 are 55% and 45%, respectively. In this way, it is possible to automatically determine the resolution by counting the number of read pulses (or the number of errors) for various slice levels.

Figure 9:
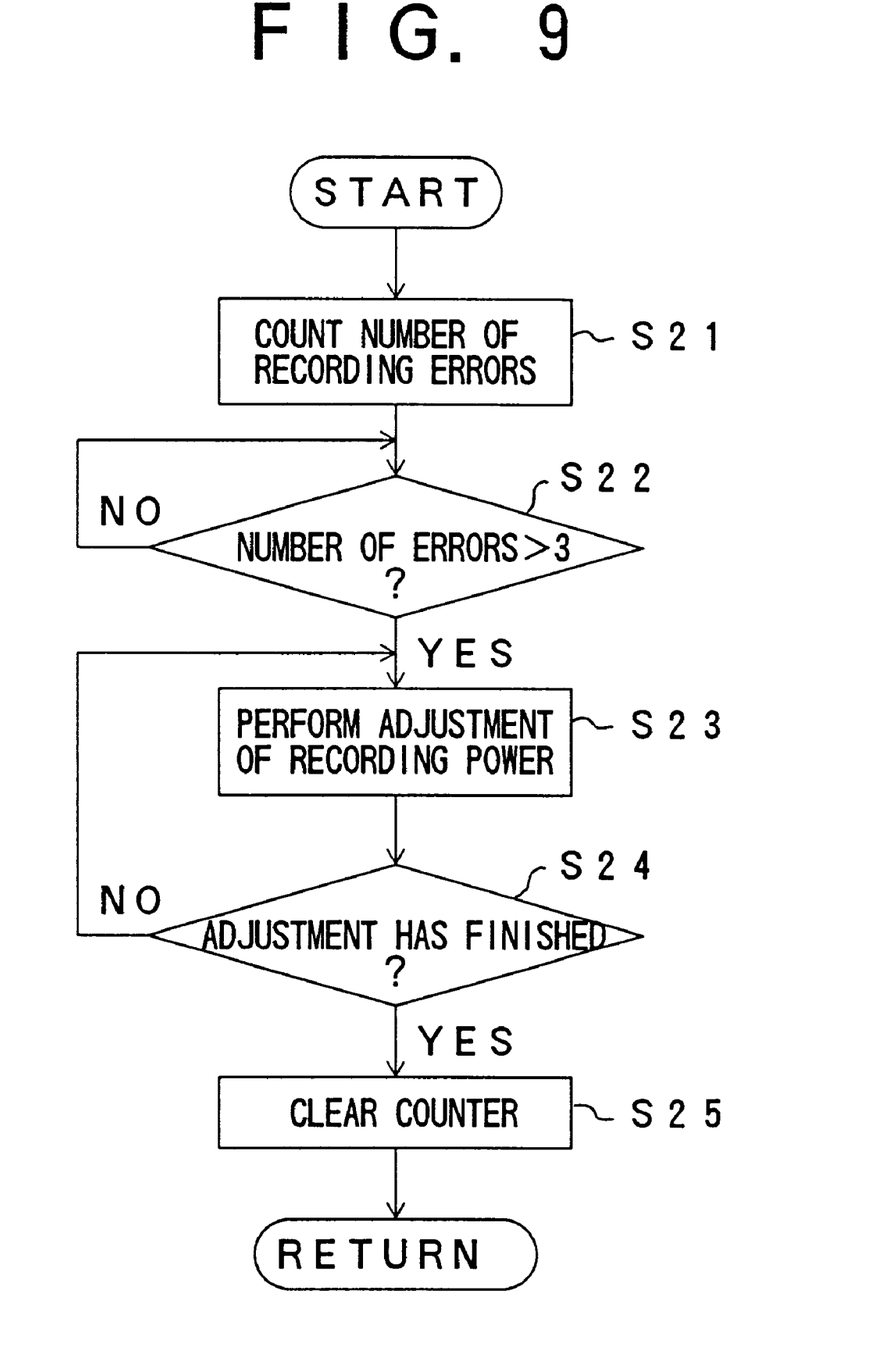
FIG. 9 is a flowchart of a procedure in which the operation for automatically adjusting the recording power is performed when a predetermined condition is satisfied after the shipment of the apparatus.

FIG. 9 is a flowchart showing a procedure in which the operation for automatically adjusting the recording power is carried out by the optical system control circuit 17 when a predetermined condition is satisfied after the optical disk apparatus 11 has been shipped.

In step S21 of FIG. 9, the number of recording errors is counted. In step S22, it is determined whether or not the counted number of the error exceeds three. If it is determined that the counted number does not exceed three, then the above steps S21 and S22 are repeated.

If the counted number of errors exceeds three, the above-mentioned operation for automatically adjusting the recording power, which is shown in FIG. 2, is performed in step S23. By means of this, the recording power is automatically adjusted after the shipment of the apparatus so that the recording power of laser light which is emitted by the optical head 14 is set to an optimal value.

In step S24, it is determined whether or not the operation for automatically adjusting the recording power has been completed. If it is determined that the operation has been completed, the counter of the number of recording errors is reset to zero in step S25.

As described above, the operation for automatically adjusting the recording power is performed when the number of recording errors exceeds three. Thus, it is possible to maintain the state in which data or information recorded on the optical disk 12 can be perfectly read, even if the recording power has changed due to a decrease in the laser power caused by secular changes (e.g., clouding of lenses, adhesion of dusts to lenses, or deterioration of the laser diodes itself) after the shipment or due to variations of the disks, because the recording power is adjusted each time it has changed.

Figure 10:
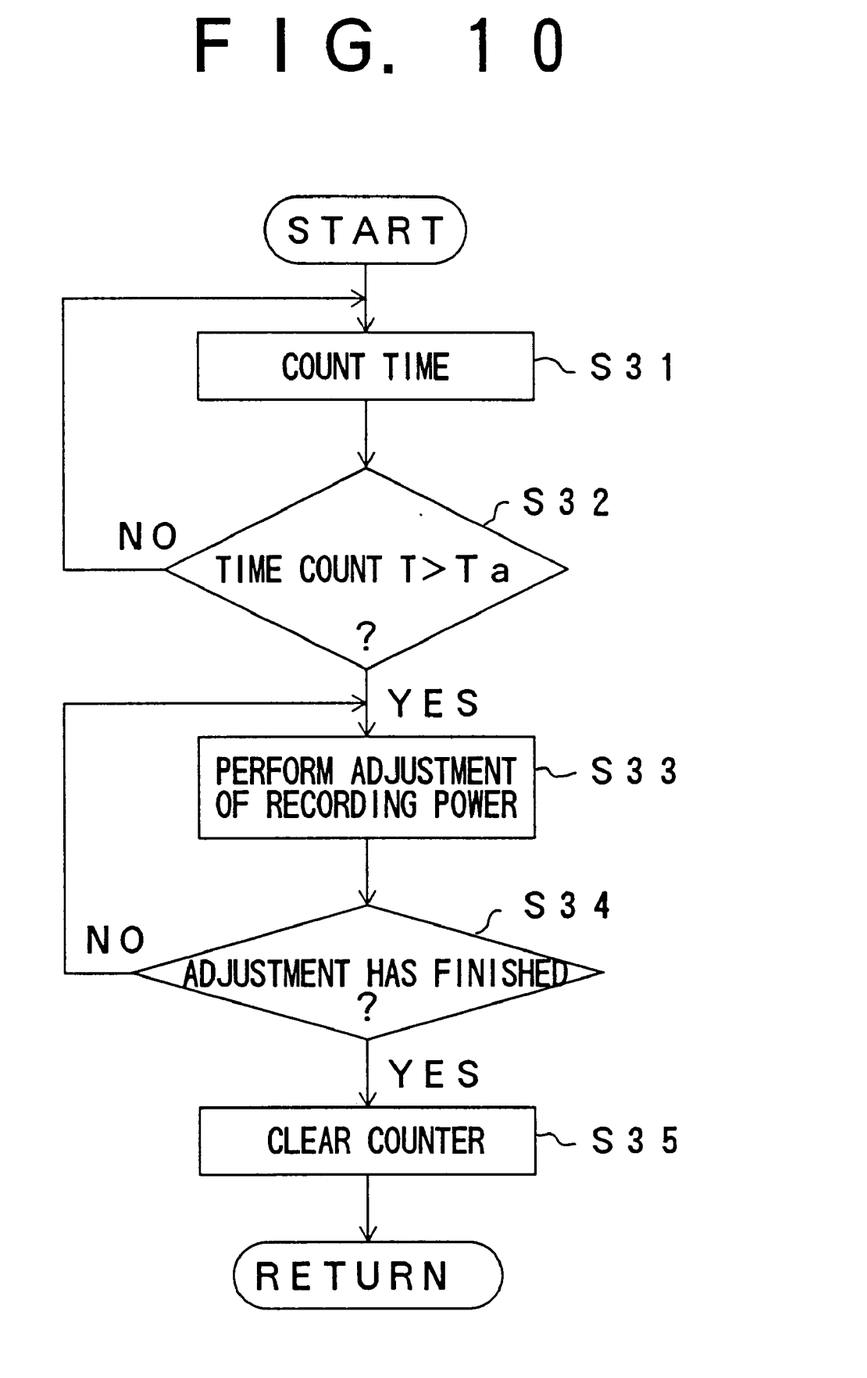
FIG. 10 is a flowchart of a procedure in which the operation for automatically adjusting the recording power is performed when another predetermined condition is satisfied after the shipment of the apparatus.

FIG. 10 is a flowchart illustrating a procedure in which the operation for automatically adjusting the recording power is carried out by the optical system control circuit 17 when another predetermined condition is satisfied after the optical disk apparatus 11 has been shipped.

In step S31 of FIG. 10, the elapsed time since the last time the operation for automatically adjusting the recording power was performed is counted by means of a time counter.

Next, in step S32, it is determined whether or not the value of the time counter (elapsed time) T exceeds a predetermined time Ta. If it is determined that the elapsed time T exceeds Ta, the above-mentioned operation for automatically adjusting the recording power, which is shown in FIG. 2, is performed in step S33. By means of this, the recording power is automatically adjusted after the shipment of the apparatus so that the recording power of laser light which is emitted by the optical head 14 is set to an optimal value.

In step 34, it is determined whether or not the operation for automatically adjusting the recording power has been completed. If it is determined that the operation has been completed, the time counter is reset to zero in step S35.

As described above, the operation for automatically adjust the recording power is performed at a predetermined interval after the shipment of the apparatus. Therefore, it is possible to maintain the state in which data or information recorded on the optical disk 12 can be perfectly read, even if the intensity of the laser light decreased due to secular changes of the apparatus after the shipment thereof because the recording power is periodically adjusted.

Figure 11:
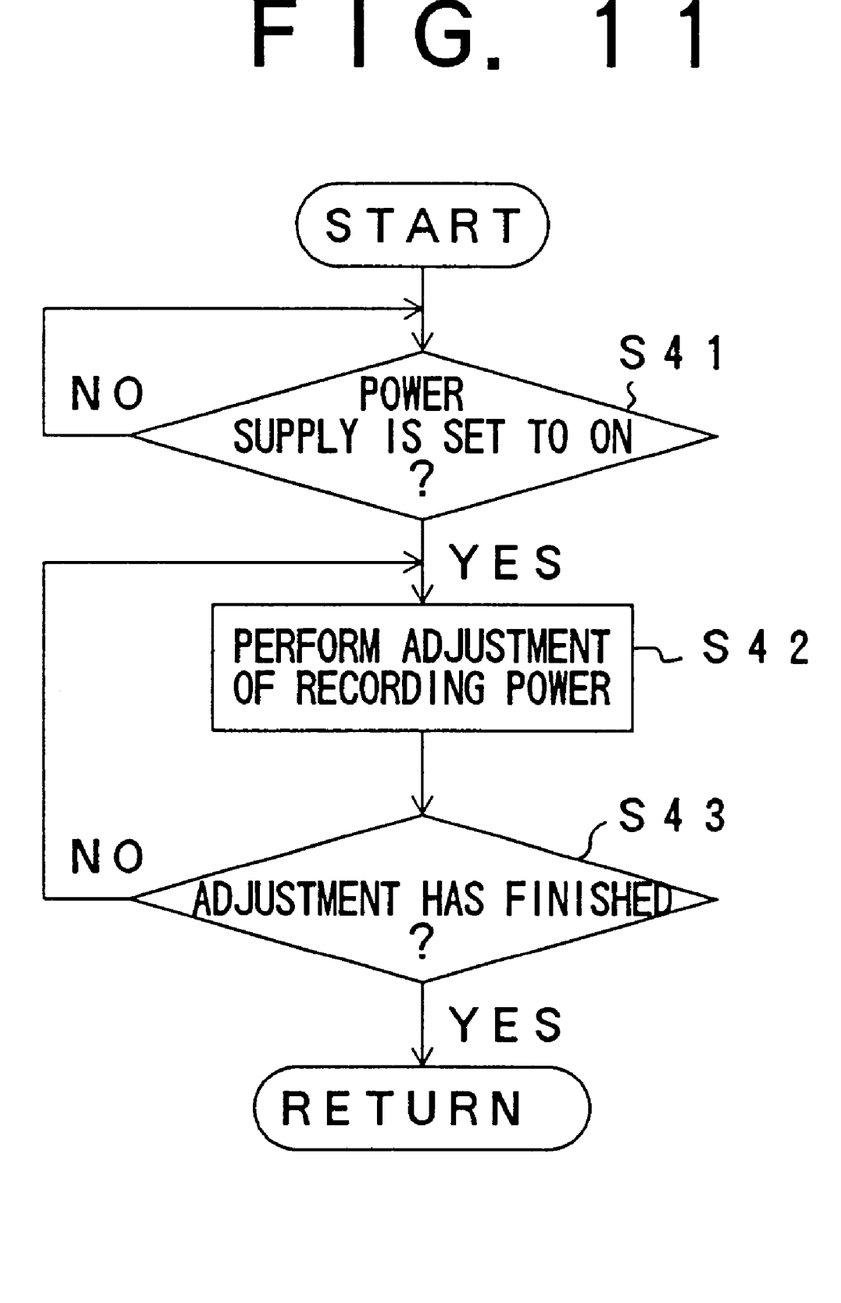
FIG. 11 is a flowchart of a procedure in which the operation for automatically adjusting the recording power is performed when still another predetermined condition is satisfied after the shipment of the apparatus.

FIG. 11 is a flowchart showing a procedure in which the operation for automatically adjusting the recording power is performed by the optical system control circuit 17 when still another predetermined condition is satisfied after the shipment of the optical disk apparatus 11.

In step S41 of FIG. 11, it is determined whether or not power supply to the optical disk apparatus 11 is set to ON.

If it is determined that the power supply is set to ON in step S41, the above-mentioned operation for automatically adjusting the recording power, which is shown in FIG. 2, is performed in step S42. By means of this, the recording power is automatically adjusted after the shipment of the apparatus so that the recording power of laser light which is emitted by the optical head 14 is set to an optimal value.

In step 43, it is determined whether or not the operation for automatically adjusting the recording power has been completed. If it is determined that the operation has been completed, the procedure is finished.

As described above, the operation for automatically adjusting the recording power is automatically performed every time the power supply to the apparatus is set to ON. Therefore, it is possible to maintain the state in which data or information recorded on the optical disk 12 can be perfectly read.

The application of the present invention is not limited to CD-ROMs or PDs but the present invention can also be applied to other types of optical disk apparatuses which perform recording or reproducing by means of laser light emitted from an optical head.

Further, the present invention is not limited to these embodiments, but variations and modifications may be made without departing from the scope of the present invention.

What is claimed is:

1. An optical disk apparatus having an optical head for reading and writing signals on an optical disk and a signal processing unit for performing predetermined signal processing on said signals, comprising:

a first controller for controlling said optical head to write a predetermined signal on a predetermined area of said optical disk with different levels of recording power of said optical head;

a second controller for reproducing said predetermined signal written on said predetermined area of said optical disk;

a detector for attempting to detect a predetermined signal pattern having a predetermined period from said reproduced signal with different slice levels;

an adjuster for determining a resolution of said reproduced signal in accordance with a slice level with which said signal pattern can be detected and automatically adjusting the recording power of said optical head based on said determined resolution.

2. The optical disk apparatus as claimed in claim 1, wherein said detector comprises:

a window generator for generating a slice window which is opened in accordance with the level of said reproduced signal relative to each of said slice levels;

a read pulse generator for generating a single read pulse every time said slice window is opened;

a determination part for counting said read pulses and determining whether said predetermined signal pattern can be detected based on said counted number.

3. The optical disk apparatus as claimed in claim 2, wherein said determination part counts said read pulses based on error correction codes which are generated by said signal processing unit in accordance with said read pulses.

4. The optical disk apparatus as claimed in claim 1, wherein said predetermined area of said optical disk is a test recording area of said optical disk.

5. The optical disk apparatus as claimed in claim 1, wherein said adjuster automatically adjusts the recording power of said optical head when the number of error occurrences in writing information is greater than a predetermined value.

6. The optical disk apparatus as claimed in claim 1, wherein said adjuster automatically adjusts the recording power of said optical head at a predetermined time interval.

7. The optical disk apparatus as claimed in claim 1, wherein said adjuster automatically adjusts the recording power of said optical head when power supply to said apparatus is set to ON.

* * * * *